United States Patent [19]

Ohashi et al.

[11] Patent Number: 4,778,624

[45] Date of Patent: Oct. 18, 1988

[54] METHOD FOR THE PREPARATION OF AN AQUEOUS EMULSION OF POLY(SILSESQUIOXANE)

[75] Inventors: Hiroshi Ohashi; Kiyohiro Kondow; Fumio Okada; Masaki Tanaka, all of Gunma, Japan

[73] Assignee: Shin-Etsu Chemical Co., Ltd., Tokyo, Japan

[21] Appl. No.: 897,309

[22] Filed: Aug. 15, 1986

[30] Foreign Application Priority Data

Aug. 20, 1985 [JP]  Japan ............................. 60-182738

[51] Int. Cl.$^4$ ........................................... B01J 13/02
[52] U.S. Cl. ................................. 252/312; 252/314; 106/287.14
[58] Field of Search ............................ 252/312, 314; 106/287.14

[56] References Cited

U.S. PATENT DOCUMENTS

| | | | |
|---|---|---|---|
| 4,179,426 | 12/1979 | Steinbach et al. | 524/588 |
| 4,388,437 | 6/1983 | Ona | 524/588 |
| 4,399,266 | 8/1983 | Matsumura | 528/10 |
| 4,476,282 | 10/1984 | Koerner et al. | 524/837 |
| 4,528,390 | 7/1985 | Kimura | 556/450 |
| 4,626,556 | 12/1986 | Nozue et al. | 522/99 |
| 4,648,904 | 3/1987 | De Pasquale et al. | 106/2 |
| 4,670,299 | 6/1987 | Fukuyama et al. | 427/96 |

*Primary Examiner*—John F. Terapane
*Assistant Examiner*—Virgina B. Caress
*Attorney, Agent, or Firm*—Jules E. Goldberg

[57] ABSTRACT

The invention provides a method for the preparation of a stable aqueous emulsion of a poly(silsesquioxane) without formation of gelled particles. In the method, a trialkoxysilane compound as the starting material is first emulsified in an aqueous medium containing a cationic surface active agent and a non-ionic surface active agent having a specified HLB value in the range from 16 to 20 in combination followed by the addition of an alkali catalyst and heating to effect hydrolysis and polycondensation of the trialkoxysilane.

3 Claims, No Drawings

METHOD FOR THE PREPARATION OF AN AQUEOUS EMULSION OF POLY(SILSESQUIOXANE)

BACKGROUND OF THE INVENTION

The present invention relates to a method for the preparation of an aqueous emulsion of poly(silsesquioxane) or, more particularly, to a method for the preparation of an aqueous emulsion of poly(silsesquioxane) having high stability without the disadvantage of formation of gelled particles by use of a cationic surface active agent.

As is well known, aqueous emulsions of a diorganopolysiloxane such as dimethylpolysiloxanes can be prepared by the polymerization in an aqueous emulsion and such aqueous emulsions of silicone are used widely in various applications. A so-called poly(silsesquioxane), which is a type of organopolysiloxanes represented by the average unit formula of $RSiO_{1.5}$, in which R is a monovalent hydrocarbon group, can also be obtained in the form of an aqueous emulsion and various methods have been proposed for such an aqueous emulsion of poly(silsesquioxane) although no quite satisfactory method has yet been disclosed. For example, the method successful for the preparation of an aqueous emulsion of dimethylpolysiloxane by use of a cationic surface active agent is not applicable in this case due to the difference in the reactivity of the starting organosilanes and the molecular structure of the resultant organopolysiloxane leading to the formation of a large amount of coarse gelled particles.

Japanese Patent Publication No. 52-12219 teaches a method for the preparation of an aqueous emulsion of a poly(silsesquioxane) in which the starting organosilane compound is added dropwise into an aqueous solution of a surface active agent and a catalyst to give the poly(silsesquioxane) in a colloidal dispersion. This method is disadvantageous because the process must be performed using a special apparatus for the dropwise addition of the silane compound and the dropwise addition of the silane compound must be carried out gradually under well-controlled conditions over an unduly long time. When a cationic surface active agent is used in this method, in particular, formation of a considerably large amount of coarse gelled particles is also unavoidable to cause troubles in filtration by filling up the meshes of the filter cloth or decrease in the content of the silicone in the filtered emulsion if it can be obtained.

Japanese Patent Publication No. 60-20959 teaches a method for the preparation of an aqueous emulsion of a low-molecular liquid silicone resin. The disclosure therein, however, relates to a method of mere emulsifying dispersion of the silicone resin to give an aqueous emulsion applicable as a hydrophobic treating agent for building materials. As is understood from the formulation disclosed there that the emulsion is used with admixture of a curing catalyst of the silicone, the dispersed phase of the emulsion is a low-molecular silicone resin having curability by means of the residual alkoxy and/or silanol groups.

On the contrary, the poly(silsesquioxane) is a fully condensed solid resin insoluble in any organic solvent and, when an aqueous emulsion thereof is dried up, the poly(silsesquioxane) is obtained in a powdery form. Despite the usefulness of an aqueous emulsion of such a poly(silsesquioxane), no satisfactory method is known in respect of the stability of the emulsion and absence of coarse gelled particles.

SUMMARY OF THE INVENTION

An object of the present invention is therefore to provide a method for the preparation of a stable aqueous emulsion of a poly(silsesquioxane) without formation of coarse gelled particles.

A further object of the invention is to provide such a stable aqueous emulsion of poly(silsesquioxane) containing no coarse gelled particles even by omitting the troublesome process of filtration.

Thus, the method of the invention for the preparation of an aqueous emulsion of poly(silsesquioxane) comprises:

(a) dispersing a trialkoxysilane compound represented by the general formula $$R^1Si(OR^2)_3, \qquad (I)$$

in which $R^1$ is a substituted or unsubstituted monovalent hydrocarbon group and $R^2$ is a hydrogen atom or a monovalent hydrocarbon group having 1 to 6 carbon atoms, or a partial hydrolysis-condensation product thereof, in an aqueous solution containing a cationic surface active agent and a non-ionic surface active agent or a combination of two kinds or more of non-ionic surface active agents, the HLB value or the overall HLB value thereof being in the range from 16 to 20, in amounts of 10 to 30% by weight and 5 to 50% by weight, respectively, based on the amount of the poly(silsesquioxane) to be formed to give an aqueous emulsion;

(b) adding a water-soluble alkaline compound to the aqueous emulsion; and (c) heating the aqueous emulsion to effect hydrolysis and polycondensation of the trialkoxysilane compound or the partial hydrolysis-condensation product thereof into a poly(sil- sesquioxane).

Accordingly, the aqueous emulsion of a poly(silsesquioxane) of the invention is a stable dispersion of particles of a poly(silsesquioxane) represented by the average unit formula of $R^1SiO_{1.5}$, in which $R^1$ has the same meaning as defined above, in an aqueous medium containing a cationic surface active agent and a non-ionic surface active agent in combination.

DETAILED DESCRIPTION OF THE PREFERRED EMBODIMENTS

As is understood from the above given summarizing description, the method of the invention is in principle a method of alkali-catalyzed emulsion polymerization of a trialkoxysilane compound as the starting material in an aqueous medium containing a surface active agent. Different from conventional methods carried out in a similar way, however, the aqueous medium in the inventive method characteristically contains a combination of two types of surface active agents of which one is cationic and the other is non-ionic having a specified HLB value. As an advantageous result by the use of such a unique combination of the surface active agents, the hydrolysis and polycondensation of the starting silane compound in the aqueous medium proceeds very smoothly and rapidly without settling of the dispersed phase or formation of coarse gelled particles to give an aqueous emulsion of a poly(silsesquioxane) in which the particles of the dispersed phase have a small particle diameter and the particle size distribution is outstandingly narrow.

The starting material used in the inventive method is a trialkoxysilane compound represented by the general formula (I) given above or a partial hydrolysis-condensation product thereof. In the general formula (I), the symbol $R^1$ denotes a substituted or unsubstituted monovalent hydrocarbon group exemplified by alkyl groups, e.g. methyl, ethyl, isopropyl, tert-butyl, octyl, lauryl and stearyl groups, alkenyl groups, e.g. vinyl and allyl groups, aryl groups, e.g. phenyl, tolyl and naphthyl groups, aralkyl groups, e.g. benzyl and 2-phenylethyl groups and cycloalkyl groups, e.g. cyclopentyl and cyclohexyl groups, as well as those substituted groups obtained by the replacement of one or more of the hydrogen atoms in the above named hydrocarbon groups with various kinds of substituent atoms and/or groups including halogen atoms and epoxy, amino, methacryloxy, carboxyl, cyano, polyoxyalkylene, mercapto and hydroxy groups.

The symbol $R^2$ in the general formula (I) denotes a hydrogen atom or, preferably, a monovalent hydrocarbon group having 1 to 6 carbon atoms exemplified by alkyl groups, e.g. methyl, ethyl, propyl and butyl groups, alkenyl groups, e.g. vinyl and allyl groups, and aryl groups, e.g. phenyl group. These hydrocarbon groups may be substituted by halogen atoms, cyano groups and the like for a part or all of the hydrogen atoms therein.

Exemplary of the trialkoxysilane compound used as the starting material in the inventive method are: methyl trimethoxy silane; vinyl triethoxy silane; 3-aminopropyl triethoxy silane; 3-glycidyloxypropyl trimethoxy silane; phenyl trimethoxy silane; 3-chloropropyl trimethoxy silane 3,3,3-trifluoropropyl trimethoxy silane; 2-(3,4-epoxycyclohexyl)ethyl trimethoxy silane; 3-mercaptopropyl triethoxy silane; 3-methacryloxypropyl trimethoxy silane; 3-(2-aminoethyl)aminopropyl trimethoxy silane; 2-(carboxylmethylthio)ethyl trimethoxy silane; and the like. These trialkoxysilane compounds can be used either alone or as a combination of two kinds or more according to the particularly intended application of the aqueous emulsion. These trialkoxysilane compounds can be used as a partial hydrolysis-condensation product provided that the dispersibility thereof in the aqueous medium is not unduly decreased.

The first step of the inventive method is to prepare an aqueous emulsion by dispersing the above named trialkoxysilane compound or partial hydrolysis-condensation product thereof in an aqueous medium containing a combination of a cationic surface active agent and a specific non-ionic surface active agent. Exemplary of suitable cationic surface active agents are the quaternary ammonium salts such as long-chain alkyl trimethl ammonium chloride, long-chain alkyl benzyl dimethyl ammonium chloride, di(long-chain alkyl) dimethyl ammonium bromide and the like though not particularly limited thereto including any of known ones. It is of course optional to use two kinds or more of the cationic surface active agents in combination according to need. The amount of the cationic surface active agent dissolved in the aqueous medium should usually be in the range from 10 to 30 % by weight based on the poly(silsesquioxane) to be produced though not particularly limitative thereto provided that no adverse influences are caused on the stability and other properties of the resultant aqueous emulsion.

The non-ionic surface active agent used in combination with the above described cationic surface active agent is exemplified by polyoxyethylene alkyl ethers, polyoxyethylene alkyl phenyl ethers, polyoxyethylene fatty acid esters, sorbitan fatty acid esters, polyoxyethylene sorbitan fatty acid esters, saccharose fatty acid esters and the like though not particularly limited thereto including any of known ones. These non-ionic surface active agents can be used either singly or as a combination of two kinds or more according to need. When a single non-ionic surface active agent is used, the non-ionic surface active agent should have an HLB value in the range from 16 to 20. When two kinds or more of non-ionic surface active agents are used in combination, the overall HLB value should be in the above specified range although each of them may have an HLB value outside this range. The HLB value here implied is a well-established concept in the chemistry of surface active agents and expressed by the formula $$HLB = 11.7 \times \log(M_w/M_o),$$

in which $M_w$ and $M_o$ are each the molecular weight of the hydrophilic group and oleophilic group, respectively, in the molecule of the surface active agent. When the HLB value or overall HLB value thereof is outside this range, the desired effect to be obtained by the use thereof in combination with the cationic surface active agent is lost and coarse gelled particles are sometimes formed in the aqueous emulsion as the polycondensation reaction proceeds. The amount of the non-ionic surface active agent dissolved in the aqueous medium should be in the range from 5 to 50 % by weight or, preferably, from 10 to 30 % by weight based on the poly(silsesquioxane) to be produced. When the amount of the non-ionic surface active agent is too small, the desired effect to be obtained by the use thereof in combination with the cationic surface active agent cannot be obtained. When the amount thereof is too large, on the other hand, the polycondensation reaction proceeds at a remarkably decreased velocity resulting in an undue extension of time for completion of the reaction.

The above described trialkoxysilane compound or a partial hydrolysis-condensation product thereof as the starting material is first dispersed in an aqueous solution of the above described two types of surface active agents using a suitable emulsifying machine such as a homomixer, colloid mill, homogenizer and the like. The amount of water should preferably be at least equal by weight to the starting material. The emulsion is of the so-called o/w (oil-in-water) type.

The hydrolysis and polycondensation reaction of the trialkoxysilane compound or a partial hydrolysis-condensation product thereof in an aqueous emulsion proceeds in an alkaline condition. Accordingly, the aqueous emulsion prepared as described above should be alkalified by the addition of a water-soluble alkaline compound. Exemplary of suitable water-soluble alkaline compounds are potassium hydroxide, sodium hydroxide, rubidium hydroxide, sodium carbonate, tetraalkyl ammonium hydroxides, e.g. tetramethyl ammonium hydroxide, and the like. The amount of the alkaline compound added to the aqueous emulsion should be in the range from 1 to 10 % by weight based on the poly(silsesquioxane) to be produced. It should be noted here that the addition of the water-soluble alkaline compound should necessarily follow the emulsification of the starting material in the aqueous medium containing the surface active agents. When, on the contrary, the starting material is emulsified in an aqueous medium containing the surface active agents and the water-soluble alkaline compound altogether, no satisfactory results would be obtained.

The thus alkalified aqueous emulsion of the starting material is then heated at a temperature in the range from 20° to 90° C. or, preferably, from 20° to 70° C. for 1 to 10 hours under agitation to effect the hydrolysis of the alkoxy groups in the starting material followed by the polycondensation to give a poly(silsesquioxane) represented by the average unit formula $R^1SiO_{1.5}$ as finely dispersed in the aqueous medium. The alkalinity of the thus obtained aqueous emulsion should preferably be neutralized by adding a weak acid such as acetic acid for most applications. The polycondensation reaction proceeds very smoothly and rapidly without formation of coarse gelled particles so that the aqueous emulsion of the poly(silsesquioxane) is quite stable and uniform even without the troublesome procedure of filtration. The aqueous emulsion can be dried up by evaporating water at room temperature or at a temperature somewhat higher than room temperature to give a finely divided white powder which is insoluble in any organic solvent.

The particles of the poly(silsesquioxane) have an outstandingly small particle diameter in the range from about 0.05 to about 0.5 $\mu$m and the particle size distribution thereof is narrow. The aqueous emulsion is so stable as to be diluted to any desired concentration by merely adding water to give a working emulsion for actual applications. The material to be treated on the surface with the inventive aqueous emulsion of poly(silsesquioxane) is coated with the working emulsion by brushing, spraying, dipping or any other suitable method followed by drying, if necessary, with heating. Thus treated materials are imparted with various desirable properties such as water repellency, non-slipperiness, flexibility, stain resistance, mold releasability and so on so that the inventive aqueous emulsion of poly(silsesquioxane) is useful as a treatment agent of various kinds of fabrics, papers, leathers, metals, ceramics including glass, plastics and the like.

The hydrolysis and polycondensation reaction of the trialkoxysilane compound or partial hydrolysis-condensation product thereof can be performed in the presence of an organopolysiloxane having di- or monofunctional units such as octamethyl cyclotetrasiloxane and hexamethyl disiloxane to effect concurrent equilibration reaction. The material, e.g. fabrics, treated with such an aqueous emulsion of modified poly(silsesquioxane) can be imparted with somewhat improved soft and pleasant touch. The inventive aqueous emulsion of poly(silsesquioxane) can optionally be admixed with various kinds of additives soluble or dispersible in water including softening agents, water-repellents, water absorbent finishing agents, antistatic agents, flame retardants, crease-resistant agents and so on depending on the particular applications intended.

In the following, the method of the present invention is described in more detail by way of examples.

EXAMPLE 1 (Preparations 1 to 5)

An aqueous emulsion was prepared, in Preparation 1, using a homogenizer, from a mixture composed of 200 g of methyl trimethoxy silane, 20 g of lauryl trimethyl ammonium chloride as a cationic surface active agent, 20 g of a polyoxyethylene nonyl phenyl ether having an HLB value of 18.5 and 658 g of water and introduced into a flask of 2 liter capacity equipped with a stirrer, thermometer and reflux condenser. Then, the aqueous emulsion in the flask was admixed with an aqueous solution of 2 g of sodium hydroxide in 100 g of water and heated at 50° C. under agitation. After 3 hours of reaction under continued agitation, the emulsion was cooled to 30° C. and neutralized by adding 3 g of acetic acid to terminate the reaction.

The thus obtained aqueous emulsion was stable and had a pale bluish translucent appearance containing 11.7 % by weight of the non-volatile matter after heating for 3 hours at 105° C. including the poly(methylsilsesquioxane) $CH_3SiO_{1.5}$ and the surface active agents. This content was very close to the theoretically expected value of 11.8 % by weight. The particles of the poly(silsesquioxane) dispersed in this emulsion had an average particle diameter of about 0.07 $\mu$m and were so fine that at least 98 % by weight of the particles had a diameter of 0.2 $\mu$m or smaller. The aqueous emulsion was quite uniform and absolutely free from coarser gelled particles.

In further preparation of aqueous emulsions in Preparations 2 to 5, the polyoxyethylene nonyl phenyl ether having an HLB value of 18.5 was replaced with: the same amount, i.e. 20 g, of other polyoxyethylene nonyl phenyl ethers having an HLB value of 17.0 and 16.0 in Preparations 2 and 3, respectively; a combination of each 10 g of two polyoxyethylene nonyl phenyl ethers having HLB values of 13.0 and 20.0 to give an overall HLB value of 16.5 in Preparation 4; or a combination of 5 g and 15 g of polyoxyethylene nonyl phenyl ethers having HLB values of 8.0 and 20.0, respectively, to give an overall HLB value of 17.0 in Preparation 5. The results in each of these preparations were substantially the same as in Preparation 1.

COMPARATIVE EXAMPLE 1 (Preparations 6 to 10)

The experimental procedure in Preparation 6 was substantially the same as in Preparation 1 of Example 1 excepting the omission of the non-ionic surface active agent and increase of the amount of the cationic surface active agent to 40 g. In this case, however, the addition of the aqueous solution of sodium hydroxide to the aqueous emulsion was immediately followed by the formation of a large amount of gelled masses to cause difficulties in agitation which could be continued no longer.

In Preparations 7 to 10, the same procedure as in Preparation 1 was undertaken excepting that the non-ionic surface active agent was replaced with the same amount, i.e. 20 g, of other polyoxyethylene nonyl phenyl ethers having an HLB value of 8.0 or 15.2 in Preparations 7 and 8, respectively, or with a combination of each 10 g of two poly-oxyethylene nonyl phenyl ethers having HLB values of 8.0 and 18.5 to give an overall HLB value of 13.3 in Preparation 9 or two poly-oxyethylene nonyl phenyl ethers having HLB values of 13.0 and 18.5 to give an overall HLB value of 15.8 in Preparation 10.

The results of these further comparative preparations were as follows. Namely, the addition of the aqueous solution of sodium hydroxide to the emulsion was immediately followed by the formation of a large amount of gelled masses when the HLB value or overall HLB value of the non-ionic surface active agent(s) was 8.0, 15.2 or 13.3 while the formation of gelled material was less rapid and gradual precipitation of the gelled masses was found as the reaction proceeded when the overall HLB value of the non-ionic surface active agents was 15.8 although the overall amount of the gelled material was quite as large as in the former three cases.

EXAMPLE 2 (Preparations 11 to 16) and COMPARATIVE EXAMPLE 2 (Preparations 17 to 19)

The experimental procedure in each of Preparations 11 to 16 was substantially the same as in Preparation 1 except that the polyoxyethylene nonyl phenyl ether used in Preparation 1 was replaced with the same amount of one of other non-ionic surface active agents including: a polyoxyethylene octyl phenyl ether having an HLB value of 17.3 in Preparation 11; polyoxyethylene monolauryl ether having an HLB value of 16.5 in Preparation 12; polyoxyethylene mono-stearyl ether having an HLB value of 18.0 in Preparation 13; polyoxyethylene monolaurate having an HLB value of 18.0 in Preparation 14; polyoxyethylene sorbitan monolaurate having an HLB value of 16.7 in Preparation 15 and saccharose fatty acid ester having an HLB value of 17.0 in Preparation 16. The results were substantially the same as in Example 1.

The experimental procedure in each of Preparations 17 to 19 was also about the same as in Preparation 1 except that the non-ionic surface active agent was a polyoxyethylene octyl phenyl ether having an HLB value of 13.6, polyoxyethylene monolauryl ether having an HLB value of 13.1 or polyethylene glycol, respectively. The results were that the addition of the aqueous solution of sodium hydroxide to the aqueous emulsion was immediately followed by the formation of a large amount of gelled masses.

EXAMPLE 3 (Preparations 20 to 22) and COMPARATIVE EXAMPLE 3 (Preparations 23 and 24)

The experimental procedure in each of Preparations 20 to 22 was substantially the same as in Preparation 1 except that the amount of the polyoxyethylene nonyl phenyl ether having an HLB value of 18.5 was varied to 6.0 g, 12.0 g or 60.0 g, respectively. When the amount was 12.0 g or 60.0 g, the results were substantially the same as in Example 1 while, when the amount was 6.0 g, a small amount of gelled material was found in the aqueous emulsion after polycondensation but the gelled material could be easily removed by filtration without particular difficulties to give a filtered aqueous emulsion containing 11.4 % by weight of the poly(methylsilsesquioxane).

On the other hand, the amount of the same non-ionic surface active agent was decreased to 5.0 g or increased to 71.0 g in Preparations 23 and 24, respectively. The results were that the addition of the aqueous solution of sodium hydroxide to the aqueous emulsion was immediately followed by the formation of a large amount of gelled masses when the amount of the non-ionic surface active agent was 5.0 g while no gelled material was formed when the amount thereof was increased to 71.0 g although the reaction was greatly retarded and the emulsion after 10 hours of the reaction contained only 9.2 % by weight of the poly(methylsilsesquioxane).

EXAMPLE 4 Preparations 25 and 26) and COMPARTIVE EXAMPLE 4 (Preparations 27 and 28)

The experimental procedure in Preparations 25 and 26 was substantially the same as in Preparation 1 except that the lauryl trimethyl ammonium chloride as the cationic surface active agent in Preparation 1 was replaced with the same amount of stearyl trimethyl ammonium chloride or lauryl benzyl dimethyl ammonium chloride, respectively. The results were substantially the same as in Preparation 1.

The experimental procedure in Preparations 27 and 28 was also substantially the same as in Preparation 1 except that the non-ionic surface active agent was omitted and, instead, each 40 g of stearyl trimethyl ammonium chloride or lauryl benzyl dimethyl ammonium chloride, respectively, were used as the cationic surface active agent. The results were substantially the same as in Comparative Example 1.

EXAMPLE 5 (Preparations 29 to 32)

The experimental procedure in each of these Preparations was substantially the same as in Preparation 1 except that the reaction temperature was 20° C. or 70° C. in Preparations 29 and 30, respectively, instead of 50° C. and the amount of the sodium hydroxide catalyst was decreased to 1.0 g or increased to 10.0 g in Preparations 31 and 32, respectively. The results were substantially the same as in Preparation 1.

EXAMPLE 6 (Preparations 33 to 37) and COMPARATIVE EXAMPLE 5 (Preparations 38 and 39)

The experimental procedure in each of Preparations 33 to 37 was substantially the same as in Preparation 1 except that 200 g of the methyl trimethoxy silane as the starting material were replaced with: 210 g of 3-aminopropyl triethoxy silane in Preparation 33; 150 g of 3-glycidyloxypropyl trimethoxy silane in Preparation 34; a mixture of 110 g of 3-glycidyloxypropyl trimethoxy silane and 60 g of methyl trimethoxy silane in Preparation 35; 140 g of stearyl trimethoxy silane in Preparation 36 or a mixture of 100 g of methyl trimethoxy silane and 60 g of octamethyl cyclotetrasiloxane in Preparation 37. The results were substantially the same as in Preparation 1 except that the aqueous emulsion prepared in Preparation 33 was somewhat yellowish.

The experimental procedure in Preparations 38 and 39 was substantially the same as in Preparations 33 and 37, respectively, described above except that the non-ionic surface active agent was omitted. The results were substantially the same as in Comparative Example 1.

COMPARATIVE EXAMPLE 6 (Preparation 40)

The experimental procedure was about the same as in Preparation 1 and, into a flask of 2 liter capacity equipped with a stirrer, thermometer, dropping funnel and reflux condenser were introduced 20 g of the same cationic surface active agent, 20 g of the same non-ionic surface active agent, 2 g of sodium hydroxide, and 758 g of water to form an aqueous alkaline solution containing the surface active agents and, after increase of the temperature to 50° C., 200 g of methyl trimethoxy silane were introduced dropwise into the aqueous solution in the flask through the dropping funnel over a period of 10 hours under agitation followed by further continued agitation for additional 2 hours at the same temperature.

Thereafter, the reaction mixture was cooled to 30° C. and admixed with 3 g of acetic acid to terminate the reaction. It was noted in this case that a gelled material was formed gradually already during the dropwise addition of methyl trimethoxy silane and a considerable amount of the gelled material was found on the bottom of the flask when the reaction was completed.

The thus prepared aqueous emulsion containing the gelled material was hardly filtrable using a filter cloth of cotton because the mesh openings of the filter cloth were badly filled up by the gelled material although a small volume of a filtered emulsion could be obtained which, by analysis, contained only 8.2 % by weight of the non-volatile matter after heating for 3 hours at 105° C. including the poly(methylsilsesquioxane) and the surface active agents. This content was much smaller than the theoretically expected value of 11.8 % by weight.

What is claimed is:

1. A method for the preparation of an aqueous emulsion without the formation of coarse gelled particles of a poly(silsesquioxane) represented by the average unit formula $R^1SiO_{1.5}$ which comprises the successive steps of:

(a) dispersing a trialkoxysilane compound represented by the general formula $$R^1Si(OR^2)_3,$$

in which $R^1$ is a substituted or unsubstituted monovalent hydrocarbon group and $R^2$ is a hydrogen atom or a monovalent hydrocarbon group having 1 to 6 carbon atoms, or a partial hydrolysis-condensation product thereof, in an aqueous solution containing a combination of a cationic surface active agent and one or more non-ionic surface active agents, the HLB value or the overall HLB value thereof being in the range from 16 to 20, in amounts of 10 to 30 % by weight and 5 to 50 % by weight, respectively, based on the amount of the poly(silsesquioxane) to be formed to give an aqueous emulsion;

(b) adding a water-soluble alkaline compound to the aqueous emulsion; and (c) heating the aqueous emulsion to effect hydrolysis and polycondensation of the trialkoxysilane compound or the partial hydrolysis-condensation product thereof into a poly(silsesquioxane).

2. The method as claimed in claim 1 wherein the cationic surface active agent is a quaternary ammonium halide.

3. The method as described in claim 1 wherein the amount of the water-soluble alkaline compound in the aqueous emulsion is in the range from 1 to 10 % by weight based on the amount of the poly(silsesquioxane).

* * * * *